United States Patent
Padilla et al.

(10) Patent No.: US 10,468,931 B2
(45) Date of Patent: Nov. 5, 2019

(54) GENERATOR CONNECTION RING SUPPORT DEVICE

(71) Applicant: General Electric Company, Schenectady, NY (US)

(72) Inventors: Karina Elizabeth Padilla, Galena Park, TX (US); Anthony Salvatore Arrao, Clifton Park, NY (US); Jayan Kaadaapuram George, Glenville, NY (US); Jason Rueda, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 273 days.

(21) Appl. No.: 15/366,494

(22) Filed: Dec. 1, 2016

(65) Prior Publication Data

US 2018/0159396 A1 Jun. 7, 2018

(51) Int. Cl.
| | |
|---|---|
| *H02K 3/38* | (2006.01) |
| *F16B 2/12* | (2006.01) |
| *F16M 13/02* | (2006.01) |
| *H02K 3/28* | (2006.01) |

(52) U.S. Cl.
CPC ............ *H02K 3/38* (2013.01); *F16B 2/12* (2013.01); *F16M 13/02* (2013.01); *H02K 3/28* (2013.01); *H02K 2203/09* (2013.01)

(58) Field of Classification Search
CPC ........... H02K 5/22; H02K 5/225; H02K 3/28; H02K 3/38; H02K 2203/09; F16B 2/12; F16M 13/02

USPC .......................................... 310/71, 260, 270
See application file for complete search history.

(56) References Cited

U.S. PATENT DOCUMENTS

| | | |
|---|---|---|
| 3,089,048 A | 5/1963 | Bahn et al. |
| RE28,478 E | 7/1975 | Bahn et al. |
| 4,782,579 A | 11/1988 | Rowe et al. |
| 5,140,740 A | 8/1992 | Weigelt |
| 9,362,788 B2 | 6/2016 | Shoykhet |

(Continued)

FOREIGN PATENT DOCUMENTS

| | | |
|---|---|---|
| CN | 103427527 A | 12/2013 |
| GB | 960148 | 6/1964 |

(Continued)

*Primary Examiner* — Nguyen Tran
*Assistant Examiner* — Monica Mata
(74) *Attorney, Agent, or Firm* — Dale Davis; Hoffman Warnick LLC (57) ABSTRACT

A generator connection ring support device includes a base, a first protruding member extending from the base, a second protruding member extending from the base substantially parallel to the first protruding member, a fastener hole extending through the base and the first protruding member, and a clamping hole extending through the base into the first slot. The clamping hole is configured to at least partly house a clamping element. The first and second protruding members define a first slot therebetween to receive a connection ring, each protruding member having a first end proximate the base and a second end distal the base, the first protruding member configured to be fastened to an end winding axial support at the distal end of the first protruding member, the first protruding member having a longitudinal axis, the fastener hole aligned with the longitudinal axis of the first protruding member.

14 Claims, 3 Drawing Sheets

(56) References Cited

U.S. PATENT DOCUMENTS

2012/0091853 A1* 4/2012 Dorsey ............... H02K 3/505
                                                    310/260
2012/0126649 A1* 5/2012 Kn .................... H02K 3/505
                                                    310/91

FOREIGN PATENT DOCUMENTS

GB       1535841       12/1978
GB       2485663 A      5/2012

* cited by examiner

GENERATOR CONNECTION RING SUPPORT DEVICE

BACKGROUND OF THE INVENTION

The disclosure relates generally to generator connection rings, and more particularly, to a support for generator connection rings.

A generator can produce a significant amount of vibration in its components and attached equipment during operation. To reduce or prevent the effects of vibration in connection rings, which carry electrical current away from the generator, the connection rings are braced and restrained. Blocks are placed between each connection ring, and fiberglass roving is strung around the connection rings, the blocks, and an axial support to tie the three together. The fiberglass roving ties the connection rings to the blocks to lock the connection rings at a spacing determined by the blocks, and ties the connection rings to the axial support to secure the connection rings from moving radially (radially with respect to a center axis of both the connection rings and the generator). A resin is applied to coat the fiberglass roving, to increase its rigidity and strength, which further reduces axial (axial being parallel to a center axis of the generator) movement of the connection rings. The connection rings are blocked and tied in this manner at multiple designated locations around the circumference of the connection rings.

Unfortunately, securing the connection rings using roving is a lengthy, non-uniform, and inefficient process which leaves an inconsistent compression with uneven spacing between each connection ring. Blocks are fitted for each space between adjacent connection rings and roving is hand-wrapped at each location, which consumes a significant amount of time, and results in uneven amounts of radial compression on each connection ring and at each location around the circumference of the connection rings. The variability of compression may result in loose ties and increased vibrations during service. Despite the resin coating the fiberglass roving, the roving is also susceptible to wear and loosening caused by vibrations, which results in sliding frictional contact between the roving and insulation covering an electrically conductive portion of the connection rings. The roving moving against the insulation can cut through the insulation to expose the electrically conductive portion.

Maintaining this connection ring support system is also a time consuming process because an operator must cut through the resin and the fiberglass roving to remove the roving and the blocks. Then the blocks, roving, and resin must be reapplied.

BRIEF DESCRIPTION OF THE INVENTION

A generator connection ring support is provided that can be used uniformly at various support locations around a circumference of the connection rings, that decreases installation and maintenance labor and time, and that provides for easy adjustment of radial compression on each connection ring.

A first aspect of the disclosure provides a generator connection ring support device. The generator connection ring support device includes a base, a first protruding member extending from the base, a second protruding member extending from the base substantially parallel with the first protruding member, and a clamping element positioned at the base between the first protruding member and the second protruding member. The first protruding member and the second protruding member define a first slot therebetween to receive a connection ring. Each protruding member has a first end proximate the base and a second end distal the base. The first protruding member is configured to be fastened to an end winding axial support at the second end of the first protruding member. The clamping element is configured to be adjusted to move relative to the base into the first slot.

A second aspect of the disclosure provides a generator connection ring support device. The device includes a base, a first protruding member extending from the base, a second protruding member extending from the base substantially parallel to the first protruding member, a fastener hole aligned with the longitudinal axis of the first protruding member, and a clamping hole extending through the base into the first slot. The clamping hole is configured to at least partly house a clamping element. The fastener hole extends through the base and the first protruding member. The first and second protruding members define a first slot therebetween to receive a connection ring. Each protruding member has a first end proximate the base and a second end distal the base, the first protruding member configured to be fastened to an end winding axial support at the distal end of the first protruding member, the first protruding member having a longitudinal axis.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure, it will become necessary to select certain terminology when referring to and describing relevant machine components within the industrial generator industry. When doing so, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms are herein applied in relation to the center axis of the turbine generator, unless otherwise specified.

As indicated above, the disclosure provides a support for generator connection rings that can be used uniformly at various support locations around a circumference of the connection rings, that decreases installation and maintenance labor and time, and that provides for easy adjustment of radial compression on each connection ring (radial being relative to a center axis of the generator).

Figure 1:
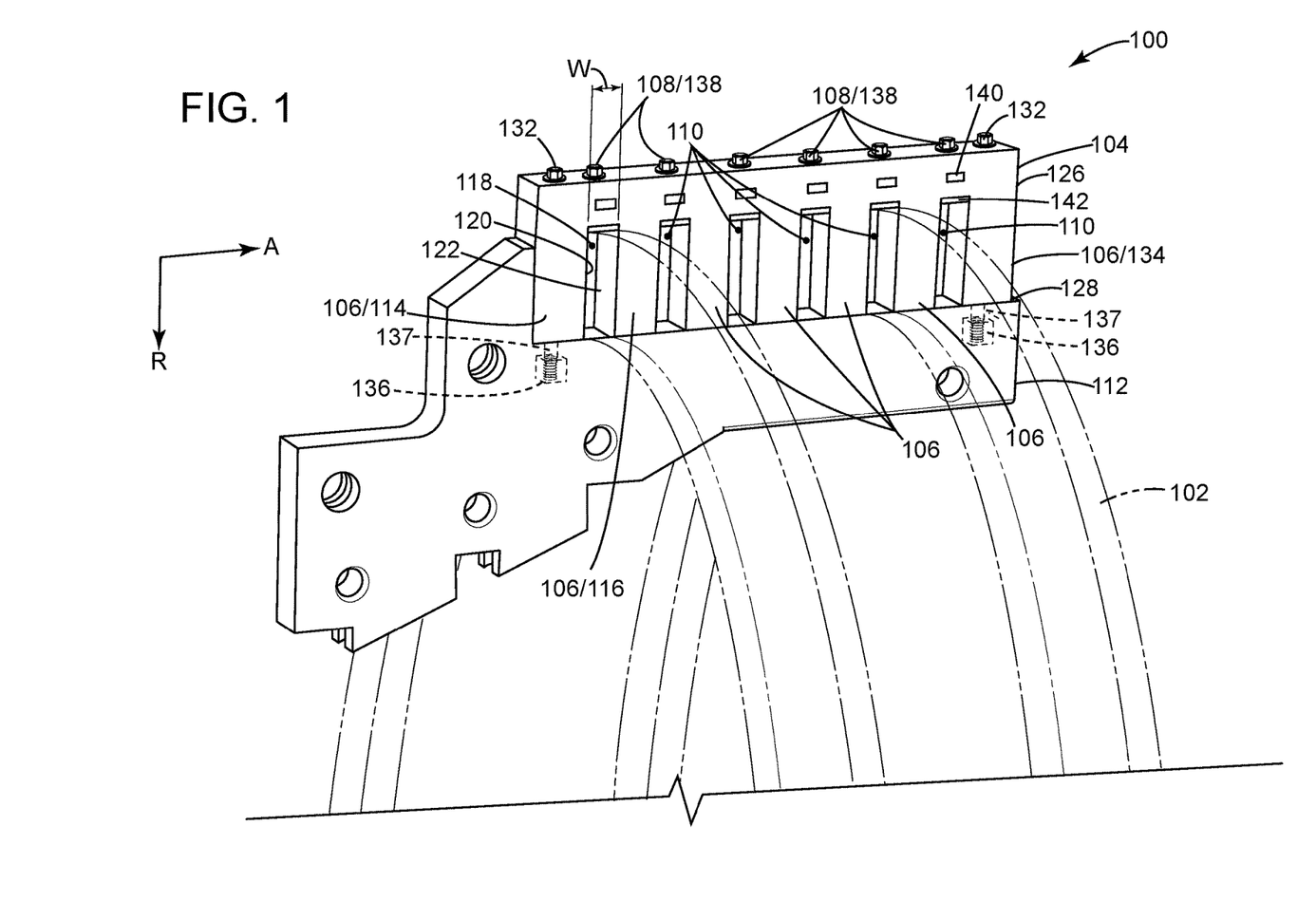
FIG. 1 shows a perspective view of a generator connection ring support device according to various embodiments, for supporting connection rings and reducing or preventing vibration in connection rings.

FIG. 1 illustrates a generator connection ring support device 100 for supporting connection rings 102 and reducing or preventing vibration in connection rings 102. Connection ring support device 100 can include a base 104, protruding members 106 extending from base 104, and at least one clamping element 108 positioned at base 104 between any desired two adjacent protruding members 106. Each pair of adjacent protruding members 106 defines a slot 110 to fit and receive therebetween a respective connection ring 102. Protruding members 106 provide axial support (axial being parallel to a center axis of the generator (no shown) or connection rings 102) for connection rings 102. Each clamping element 108 is configured to be adjusted to move relative to base 104 toward or into a respective slot 110, to provide radial support and compression (radial being relative to a center axis of the generator or connection rings 102), of connection rings 102 as explained further below. Base 104 and protruding members 106 can be fastened to an end winding axial support 112, which, in some embodiments, can also be considered part of generator connection ring support device 100. End winding axial support 112 is fixed with respect to the generator (e.g., by fastening to the generator), and fastening generator connection ring support device 100 to end winding axial support 112 also fixes generator connection ring support device 100 with respect to the generator, facilitating axial support of connection rings 102 by protruding members 106 and radial compression of connection rings 102 by each clamping element 108.

Figure 2:
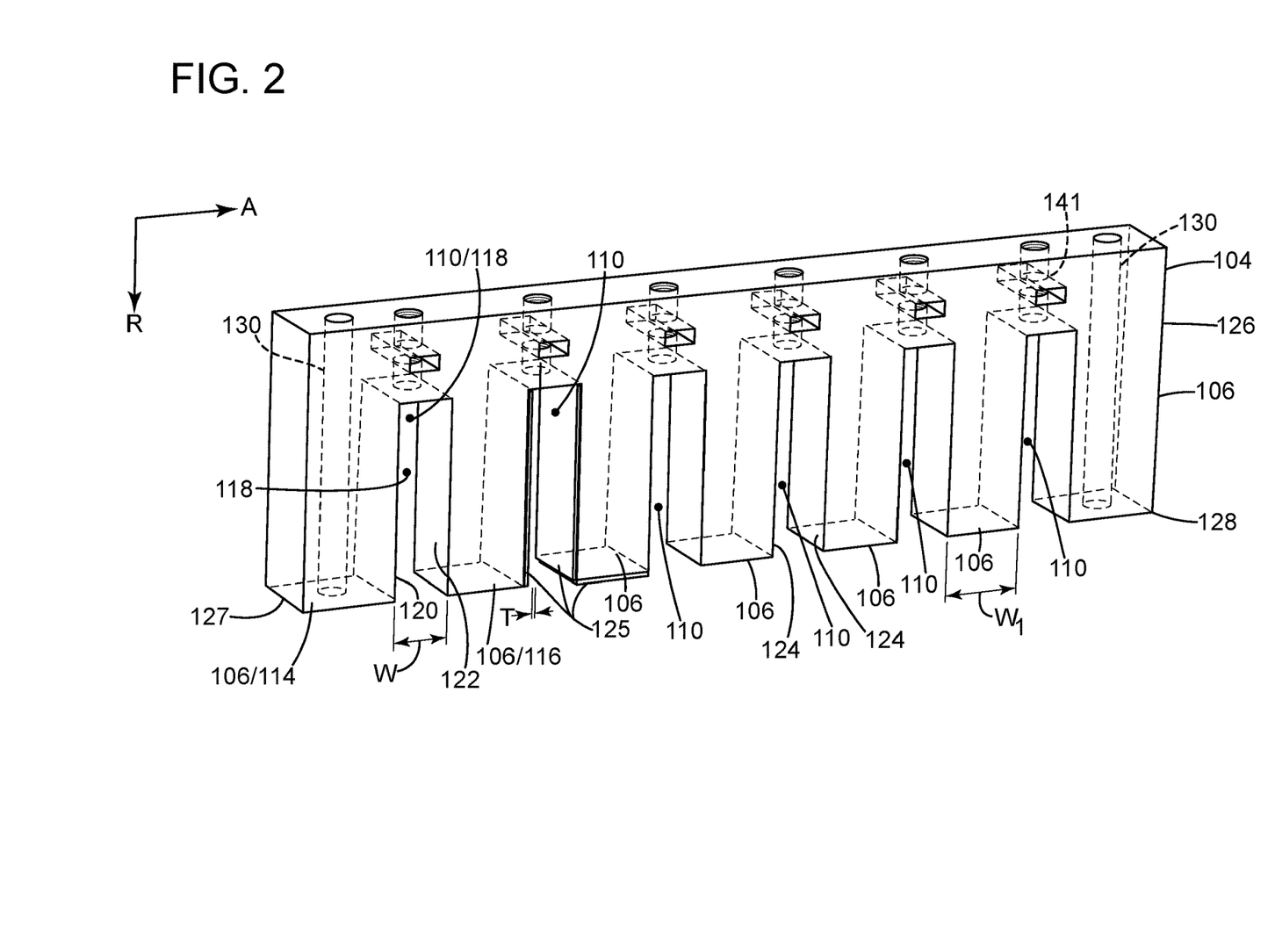
FIG. 2 shows a perspective view of the connection ring support device of FIG. 1 disconnected from an end winding axial support.

FIG. 2 illustrates connection ring support device 100 disconnected from end winding axial support 112 (FIG. 1). Referring to FIG. 1 and FIG. 2, protruding members 106 can include a first protruding member 114 and a second protruding member 116, which extend substantially parallel with each other. "Substantially parallel" means parallel+/− 10 degrees. A first slot 118 is defined between first protruding member 114 and second protruding member 116. Additional protruding members 106 can also be included as necessary or desired to define additional slots 110 to accommodate any particular number of connection rings 102. Each additional protruding member 106 that is included also extends substantially parallel with first protruding member 106, and in combination with an adjacent protruding member 106, defines an additional slot 110 therebetween. First slot 118 is defined, in part, by a first slot-defining surface 120 of first protruding member 114 facing an opposing slot defining surface 122 of second protruding member 116. Each additional slot 110 that is included is similarly defined by opposing surfaces 124 of adjacent protruding members 106. First slot 118 and each additional slot 110 can be sized to receive a respective connection ring 102 with little or no clearance, so that each slot 110 can easily receive a connection ring 102 but limit or prevent axial movement of a respective connection ring 102. The width W of first slot 118 and each additional slot 110, for example, can be approximately 0.0-2.0 millimeters larger than a width of respective connection rings 102 received in first slot 118 and each additional slot 110. The width W of first slot 118 is the distance between first slot-defining surface 120 of first protruding member 114 and opposing slot-defining surface 122 of second protruding member 116, and the width of each additional slot 110 is the distance between opposing surfaces 124 of adjacent protruding members 106. A protective pad 125 can be included on one or more of first slot-defining surface 120, opposing slot-defining surface 122, or opposing surfaces 124. In FIG. 2, only one slot 110 is shown with protective pads 125, though protective pads 125 can cover surfaces 120, 122, 124 within any one or more, or all slots 110. Covering all surfaces 120, 122, 124 can provide simpler, more uniform manufacturing, and protection of any connection ring 102 clamped in any slot 110. When one or more protective pads 125 are used, the width of each slot 110 is as discussed above minus the thickness T of protective pads 125. For example, if in first slot 118, one protective pad is positioned on first slot-defining surface 120 and one protective pad is positioned on opposing slot-defining surface 122, the width of first slot 118 is the distance between first slot-defining surface 120 and opposing slot-defining surface 122, minus T multiplied by 2. In some cases, "minus T multiplied by 2" is minus an amount less than T multiplied by 2, with the amount less than T multiplied by 2 being an amount of desirable deformation of protective pads 125. In these latter cases, connection rings 102 can fit in slots 110 with an interference fit with the protective pads 125, which can dampen vibration.

Protective pads 125 can protect an insulative cover of connection ring 102. Protective pads 125 provide a softer material to contact the insulating cover of connection ring 102 than the material of base 104 and/or protruding members 106. Being softer, protective pads 125 can reduce harmful friction, wearing, tearing, or piercing of the insulative cover that can tend to occur as the result of vibrations from the operating generator. Protective pads 125 can be made of material such as felt or another fabric, rubber, or plastic, amongst others. Protective pads 125 can also cover end surfaces 127 of protruding members 106 that contact end winding axial support 112. In FIG. 2, only one end surface 127 configured to contact end winding axial support 112 is shown with a protective pad 125. It should be noted, however, that any desired number of protruding members 106 can have end surface 127 covered with protective pad 125. Covering each end surface 127 of each protruding member 106 can provide relatively simple, uniform manufacturing, and protection of end winding axial support 112 at each location of contact with protruding members 106.

Each protruding member 106 between two adjacent slots 110 can have a width $W_1$ from slot 110 to adjacent slot 110 a distance equal to the actual or desired distance between adjacent connection rings 102. The width $W_1$ of protruding members 106 between two adjacent slots can be uniform, to simplify manufacturing and facilitate use of a singly sized generator connection ring support device 100 usable at each of the various connection ring support locations around the circumference of the connection rings 102. Alternatively, width $W_1$ of each protruding member 106 between two adjacent slots 110 can vary and be sized to match any variations in the actual distance between adjacent connection rings 102. In the latter case, if any connection rings 102 are spaced far from the average or norm, a generator connection ring support device 100 can be custom-sized to fit. Protruding members 106 can be fit with minimal clearance or no clearance between connection rings 102 to facilitate assembly onto connection rings 102, while also facilitating axial support of the connection rings 102, including reduction or prevention of axial vibrations. If protective pads 125 are used, or to be used, then the width $W_1$ of protruding members 106 can be shorter by an appropriate amount to provide room for protective pads 125.

Each protruding member 106 has a first end 126 proximate base 104 and a second end 128 distal base 104. One or more protruding members 106 can be configured to be fastened to end winding axial support 112 at second end 128 of a respective protruding member 106. Second ends 128 of protruding members 106 can be fastened to end winding axial support 112 using any now-known or later-developed fastening or adhering method. Bolting, screwing, welding, riveting, brazing, and adhering, amongst others, are all examples that are conceived in various embodiments. In the embodiment depicted in FIG. 1 and FIG. 2, as shown best in FIG. 2, a fastener opening 130 extends through base 104 and a longitude entirely through first protruding member 114 (e.g., from first end 126 to second end 128). As seen in FIG. 1, a fastener 132 can extend through fastener opening 130 and into end winding axial support 112. In FIG. 1, first protruding member 114 and another end protruding member 134 each are fastened to end winding axial support 112 in this manner, however, any desired protruding members 106 can each have a fastener opening 130 to be fastened to end winding axial support 112 with a fastener 132, or can be fastened to end winding axial support 112 in another now-known or later-developed manner.

End winding axial support 112 can include a fastening element 136 to engage fastener 132. For example, fastening element 136 can include an internally threaded hole in end winding axial support 112, or as illustrated in FIG. 1, fastening element 136 can be a nut 136 embedded into end winding axial support 112. In this latter case, end winding axial support 112 can be modified by removing a section to create a space to embed nut 136. Nut 136 can have internal threads to engage with external threads of fastener 112. A fastener-receiving hole 137 can be cut or drilled from an exterior surface of end winding axial support 112 to nut 136, and fastener-receiving hole 137 can receive fastener 132.

As discussed above, a clamping element 108 can be positioned at base 104 between any two adjacent protruding members 106, such as between first protruding member 114 and second protruding member 116. Referring to FIG. 1, each clamping element 108 can include a driving element 138 and an adjustment element 140, which can be aligned with respective slot 110 and can engage with driving element 138 to facilitate movement of driving element 138. As seen in FIG. 2, driving element-receiving holes 141 can be cut or drilled from an exterior surface of base 104 through base 104 to slots 110. Referring to FIG. 1, driving element-receiving holes 141 can receive driving elements 138. Still referring to FIG. 1, each driving element 138 can be configured to be adjusted to move in a respective driving element-receiving hole 141 relative to base 104 and adjustment element 140 into a respective slot 110, such as first slot 118. Each driving element 138 can be configured to be adjusted in a clamping direction substantially parallel with a direction of extension of protruding members 106, which is substantially parallel with a longitude of slots 110. Driving elements 138 can be bolts, rods, shafts, wedges, or other rigid bodies. In FIG. 1, driving elements 138 are shown as bolts with external threads, and adjustment elements 140 are shown as internally threaded nuts embedded in base 104. Adjustment elements 140 could alternatively be internally threaded holes tapped in base 104. It should be noted that clamping elements 108 are not limited to the illustrated embodiment, and that clamping elements 108 can be any now-known or later-developed device capable of providing sufficient force radially into slots 110 against connection rings 102 in slots 110. Referring to the embodiment of FIG. 1, external threads of driving elements 138 engage internal threads of adjustment elements 140, such that turning driving elements 138 moves driving elements 138 into slots 110. By adjusting driving elements 138 into respective slots 110 toward respective connection rings 102, each driving element 138 can drive into a respective connection ring 102 and clamp the respective connection ring 102 in a respective slot 110, compressing each respective connection ring 102 in a radial direction. Each clamping element 108 can also include a contact pad 142 positioned in a respective slot 110 and configured to directly contact a connection ring 102 in respective slot 110. Each contact pad 142 can be driven by a respective driving element 138 into a respective connection ring 102 to disperse force across a larger area than a surface of each driving element 138 would otherwise, which can help reduce damage to the insulation on connection rings 102. Contact pads 142 can be made of a rigid material to facilitate dispersal of force over the surface area of contact pad 142, or of a deformable or soft material to contact insulation of connection rings 102 and cushion force from driving element 138, or of rigid material coated with a deformable or soft material, to both facilitate dispersal of force uniformly and to cushion impact of driving element 138. The deformable or soft material can be the same as the material of protective pads 125.

Installation and maintenance of generator connection ring support device 100 is easy and time efficient relative to conventional methods of supporting connection rings 102. By fastening and unfastening fastener(s) 132, generator connection ring support device 100 can easily be fastened or unfastened around connection rings 102, and clamping element(s) 108 can easily be adjusted to provide a radial clamping force on connection rings 102. Further, each clamping element 108 can be adjusted as necessary or desired to selectively tune the amount of radial clamping force on each connection ring 102.

Generator connection ring support device 100 (FIGS. 1-2) may be formed in a number of ways. In some embodiments, generator connection ring support device 100 may be formed by manufacturing processes such as extruding, molding, cutting, or machining. In one embodiment, however, additive manufacturing is particularly suited for manufacturing generator connection ring support device 100 (FIGS. 1-2). As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM). In the current setting, DMLM has been found advantageous.

Figure 3:
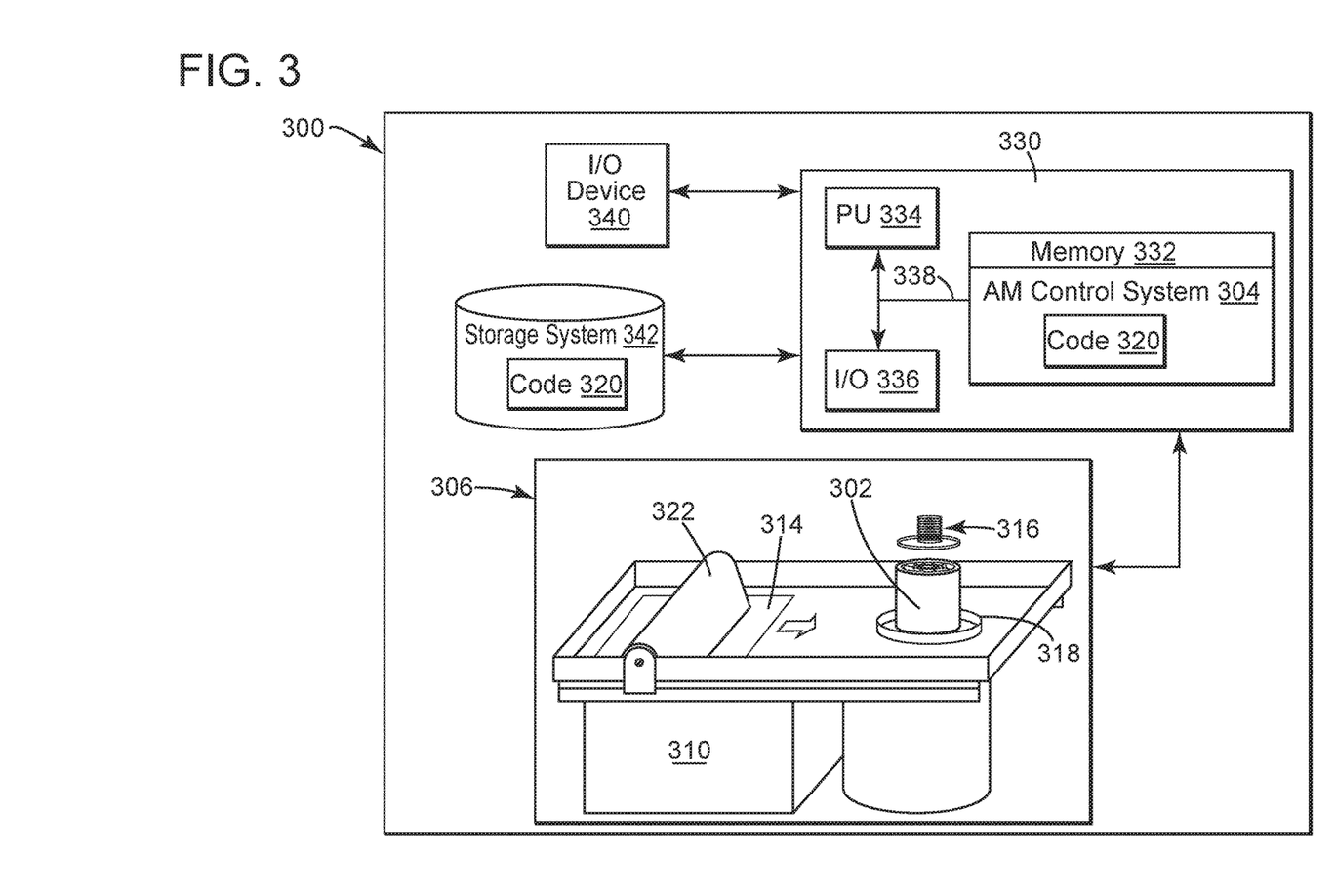
FIG. 3 shows a schematic/block view of an illustrative computerized additive manufacturing system for generating an object.

To illustrate an example of an additive manufacturing process, FIG. 3 shows a schematic/block view of an illustrative computerized additive manufacturing system 300 for generating an object 302. In this example, system 300 is arranged for DMLM. It is understood that the general teachings of the disclosure are equally applicable to other forms of additive manufacturing. Object 302 is illustrated as a double walled turbine element; however, it is understood that the additive manufacturing process can be readily adapted to manufacture generator connection ring support device 100 (FIGS. 1-2)). AM system 300 generally includes a computerized additive manufacturing (AM) control system 304 and an AM printer 306. AM system 300, as will be described, executes code 320 that includes a set of computer-executable instructions defining generator connection ring support device 100 (FIGS. 1-2) to physically generate the object using AM printer 306. Each AM process may use different raw materials in the form of, for example, fine-grain powder, liquid (e.g., polymers), sheet, etc., a stock of which may be held in a chamber 910 of AM printer 906. In the instant case, generator connection ring support device 100 (FIGS. 1-2) may be made of plastic/polymers or similar materials. As illustrated, an applicator 912 may create a thin layer of raw material 314 spread out as the blank canvas from which each successive slice of the final object will be created. In other cases, applicator 312 may directly apply or print the next layer onto a previous layer as defined by code 320, e.g., where the material is a polymer or where a metal binder jetting process is used. In the example shown, a laser or electron beam 316 fuses particles for each slice, as defined by code 320, but this may not be necessary where a quick setting liquid plastic/polymer is employed. Various parts of AM printer 306 may move to accommodate the addition of each new layer, e.g., a build platform 318 may lower and/or chamber 310 and/or applicator 312 may rise after each layer.

AM control system 304 is shown implemented on computer 330 as computer program code. To this extent, computer 330 is shown including a memory 332, a processor 334, an input/output (I/O) interface 336, and a bus 338. Further, computer 330 is shown in communication with an external I/O device/resource 340 and a storage system 342. In general, processor 334 executes computer program code, such as AM control system 304, that is stored in memory 332 and/or storage system 342 under instructions from code 320 representative of generator connection ring support device 100 (FIGS. 1-2), described herein. While executing computer program code, processor 334 can read and/or write data to/from memory 332, storage system 342, I/O device 340 and/or AM printer 306. Bus 338 provides a communication link between each of the components in computer 330, and I/O device 340 can comprise any device that enables a user to interact with computer 340 (e.g., keyboard, pointing device, display, etc.). Computer 330 is only representative of various possible combinations of hardware and software. For example, processor 334 may comprise a single processing unit, or be distributed across one or more processing units in one or more locations, e.g., on a client and server. Similarly, memory 332 and/or storage system 342 may reside at one or more physical locations. Memory 332 and/or storage system 342 can comprise any combination of various types of non-transitory computer readable storage medium including magnetic media, optical media, random access memory (RAM), read only memory (ROM), etc. Computer 330 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 332, storage system 342, etc.) storing code 320 representative of generator connection ring support device 100 (FIGS. 1-2). As noted, code 320 includes a set of computer-executable instructions defining object 302 that can be used to physically generate the object, upon execution of the code by system 300. For example, code 320 may include a precisely defined 3D model of object 302 and can be generated from any of a large variety of well-known computer aided design (CAD) software systems such as AutoCAD®, TurboCAD®, DesignCAD 3D Max, etc. In this regard, code 320 can take any now-known or later-developed file format. For example, code 320 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 320 may be translated between different formats, converted into a set of data signals and transmitted, received as a set of data signals and converted to code, stored, etc., as necessary. Code 320 may be an input to system 300 and may come from a part designer, an intellectual property (IP) provider, a design company, the operator or owner of system 300, or from other sources. In any event, AM control system 304 executes code 320, dividing generator connection ring support device 100 (FIGS. 1-2) into a series of thin slices that it assembles using AM printer 306 in successive layers of liquid, powder, sheet or other material. In the DMLM example, each layer is melted to the exact geometry defined by code 320 and fused to the preceding layer. Subsequently, the generator connection ring support device 100 (FIGS. 1-2) may be exposed to any variety of finishing processes, e.g., minor machining, sealing, polishing, assembly to another part, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" or "substantially" indicates +/−10% of the value stated, or if a range, of the values stated, unless otherwise dependent on the precision of the instrument measuring the value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A generator connection ring support device, comprising:
    a base;
    a plurality of protruding members extending from the base substantially parallel with each other, such that adjacent pairs of protruding members define a plurality of slots therebetween to receive one of a plurality of connection rings, each protruding member having a first end proximate the base and a second end distal the base, and configured to be fastened to an end winding axial support at the second end thereof;
    a fastener mechanically coupling the base to the end winding axial support through one of the plurality of protruding members and
    a plurality of clamping elements each positioned at the base, adjustable relative to the base, aligned with a respective one of the plurality of connection rings and extending radially relative to a center axis of the generator, such that each of the plurality of clamping elements applies a radial securing force to the respective one of the plurality of connection rings independently of, and in parallel with, each other.

2. The generator connection ring support device of claim 1, wherein the end winding axial support comprises a fastening element to engage the fastener and to fasten to at least one of the first protruding member and the second protruding member.

3. The generator connection ring support device of claim 2, wherein the fastener has external threads and the fastening element comprises an internally threaded hole or a hole with an embedded nut.

4. The generator connection ring support device of claim 1, wherein each of the plurality of clamping elements comprises a driving element configured to be adjusted in a clamping direction substantially parallel with the direction of extension of the protruding members, which is substantially parallel with a longitude of each slot.

5. The generator connection ring support device of claim 4, wherein the clamping element comprises an adjustment element in the base, the adjustment element configured to engage the driving element and facilitate adjustment of the driving element.

6. The generator connection ring support device of claim 5, wherein the driving element comprises a shaft with external threads and the adjustment element comprises an internally threaded hole in the base or a nut embedded in the base.

7. The generator connection ring support device of claim 1, wherein the clamping element comprises a contact pad positioned in the first slot and configured to directly contact a connection ring in the respective slot.

8. The generator connection ring support device of claim 1, wherein the first protruding member has a first slot-defining surface facing an opposing slot-defining surface of the second protruding member, a protective pad to protect an insulative cover of the connection ring being on at least one of the first slot-defining surface and the opposing slot-defining surface.

9. A generator connection ring support device, comprising:
    a base;
    a plurality of protruding members extending from the base substantially parallel with each other, such that adjacent pairs of protruding members define a plurality of slots therebetween to receive one of a plurality of connection rings, each protruding member having a first end proximate the base and a second end distal the base, and configured to be fastened to an end winding axial support at the distal end thereof and having a longitudinal axis;
    a fastener hole aligned with the longitudinal axis of one of the plurality of protruding members, the fastener hole extending through the base and one of the plurality of protruding members; and
    a plurality of clamping elements each positioned at the base, adjustable relative to the base, aligned with a respective one of the plurality of connection rings and extending radially relative to a center axis of the generator, such that each of the plurality of clamping elements applies a radial securing force to the respective one of the plurality of connection rings independently of, and in parallel with, each other.

10. The generator connection ring support device of claim 9, further comprising the end winding axial support, wherein the end winding axial support comprises a fastening element to engage the fastener and to fasten to one of the plurality of protruding members.

11. The generator connection ring support device of claim 10, wherein the fastener has external threads and the fastening element comprises an internally threaded hole or a hole with an embedded nut.

12. The generator connection ring support device of claim 9, wherein each clamping element comprises a contact pad positioned in the first slot and configured to directly contact the connection ring.

13. The generator connection ring support device of claim 9, wherein the clamping element comprises a driving element and an adjustment element, the driving element at least partially disposed in the clamping hole, the adjustment element in the base, the adjustment element to engage the driving element and facilitate adjustment of the driving element, the adjustment element being an internally threaded hole in the base or a nut embedded in the base, the driving element having a shaft with external threads.

14. The generator connection ring support device of claim 9, wherein each protruding member has a first slot-defining surface facing an opposing slot-defining surface of another protruding member, a protective pad to protect an insulative cover of the connection ring being on at least one of the first slot-defining surface and the opposing slot-defining surface.

* * * * *